United States Patent [19]

Kunugi

[11] 4,448,040
[45] May 15, 1984

[54] ABSORPTION TYPE HEAT PUMP SYSTEM

[75] Inventor: Yoshifumi Kunugi, Ibaraki, Japan

[73] Assignee: Hitachi, Ltd., Tokyo, Japan

[21] Appl. No.: 396,375

[22] Filed: Jul. 8, 1982

[30] Foreign Application Priority Data

Jul. 10, 1981 [JP] Japan .................................. 56-106991

[51] Int. Cl.³ ......................... F25B 27/02; F25B 15/00
[52] U.S. Cl. ...................................... 62/238.3; 62/112;
62/324.2; 62/332; 62/335; 62/476; 62/238.6
[58] Field of Search .................... 62/238.3, 238.6, 332,
62/335, 476, 112, 324.2

[56] References Cited

U.S. PATENT DOCUMENTS

| | | | |
|---|---|---|---|
| 2,027,610 | 1/1936 | Nesselmann et al. | 62/335 X |
| 2,283,213 | 5/1942 | Katzow | 62/238.3 X |
| 3,483,710 | 12/1969 | Bearint | 62/101 X |
| 3,824,804 | 7/1974 | Sandmark | 62/335 X |
| 4,285,209 | 8/1981 | Luthi et al. | 62/238.3 |

Primary Examiner—Lloyd L. King
Attorney, Agent, or Firm—Antonelli, Terry & Wands

[57] ABSTRACT

An absorption type heat pump system including a first heat pump of the absorption type and a second heat pump of the absorption type. The first heat pump includes a generator equipped with a heating source, a condenser, an evaporator, an absorber, and a solution heat exchanger for drawing off hot water from the condenser and the absorber for heating and hot water supply purposes. The second heat pump includes a generator equipped with a heating source, a condenser, an evaporator, an absorber and a solution heat exchanger. The condenser and the absorber of the second heat pump are mounted in the evaporator of the first heat pump and the first and second heat pumps are connected together, so as to absorb heat from atmosphere by the evaporator of the second heat pump and utilize as a heat source for vaporizing a refrigerant in the evaporator of the first heat pump the heat given off by the condenser and the absorber of the second heat pump.

13 Claims, 4 Drawing Figures

ABSORPTION TYPE HEAT PUMP SYSTEM

BACKGROUND OF THE INVENTION

1. Field of the Invention

This invention relates to an absorption type heat pump system suitable for heating a room or a space corresponding thereto and producing hot water for hot water supply and heating purposes and cold water for cooling said room or said space.

2. Description of the Prior Art

There are two types of absorption type heat pump system: one is an air cooling type using Freon (trade name) or ammonia as a refrigerant and the other is a water cooling type using water or alcohol as a refrigerant.

An absorption type heat pump system is intended to draw off heated air for heating purposes or hot water by utilizing heat released from the condenser or absorber. Thus, in an air cooling type heat pump system, it becomes necessary to install the absorber and the condenser in the room and lines connecting them with the generator and evaporator installed outside the room are large in number and complex in arrangement. This gives rise to the following problems:

(1) A refrigerant has a high pressure differential between its pressure of vaporization and pressure of condensation, so that the heat pump cycle has a low efficiency and the solution pump has great boosting work to perform.

(2) To provide comfort by heating requires a rise in the temperature of the ejected air. This raises condensation pressure and absorption temperature, and the absorber becomes low in pressure and high in temperature. This causes a reduction in the efficiency of the cycle.

(3) Freon is lower in the latent heat of vaporization than water and requires a greater amount in circulation as a refrigerant to achieve the same heating capabilities. This increases the power required for operating the solution pump.

(4) Ammonia is deleterious and unable to be led into the room for practical purposes.

(5) It becomes necessary to use an indoor heat exchanger of large size and complex construction.

A water cooling type heat pump system has the following problems:

(1) It is impossible to utilize as a heat source the heat possessed by outdoor air which is inexhaustible.

(2) A heat source of below 0° C. having the risk of freezing, it is only a heat source of above 0° C. that can be utilized.

SUMMARY OF THE INVENTION

(1) Objects of the Invention

An object of this invention is to provide an absorption type heat pump system capable of utilizing as a heat source outdoor air which is inexhaustible, particularly air of below 0° C.

Another object is to provide an absorption type heat pump system of a heat pump cycle of high efficiency.

Still another object is to provide an absorption type heat pump system capable of providing comfort by space heating.

Still another object is to provide an absorption type heat pump system capable of obtaining heated air of required temperature for space heating.

Still another object is to provide an absorption type heat pump system capable of reducing the size of heat exchangers, particularly heat exchangers installed indoors provided with a fan.

Still another object is to provide an absorption type heat pump system capable of reducing the power required for operating the pump for circulating a solution.

A further object is to provide an absorption type heat pump system involving no introduction of a deleterious refrigerant into the heat exchanger installed indoors.

(2) Statement of the Invention

The outstanding characteristic of the invention is that a novel heat pump system is formed by combining a second heat pump using Freon or ammonia as a refrigerant and outdoor air as a heat course with a first heat pump using water or alcohol as a refrigerant, such heat pump system having the function of absorbing heat from outside air through an evaporator of the heat pump cycle of Freon or ammonia and the function of releasing heat through a condenser and an absorber of the heat pump cycle of water or alcohol for heating water or air for space heating and hot water supply purposes, with the condenser and the absorber of the second heat pump being installed in the evaporator of the first heat pump.

DETAILED DESCRIPTION OF THE PREFERRED EMBODIMENTS

Figure 1:
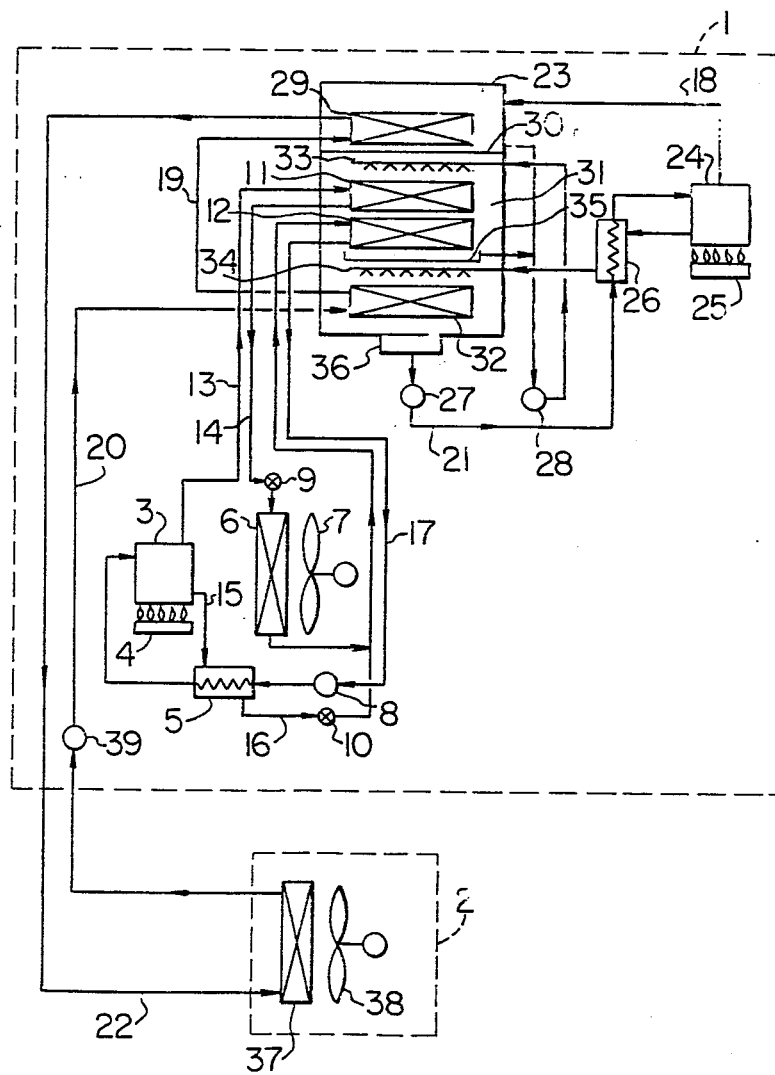
FIG. 1 is a systematic diagram of the absorption type heat pump system comprising a first embodiment of the invention.

FIG. 1 shows in a systematic diagram the first embodiment of the absorption type heat pump system in conformity with the invention. The heat pump system comprises an outdoor unit 1 and an indoor unit 2. The outdoor unit 1 comprises a generator 24, a burner 25, a solution heat exchanger 26, a refrigerant pump 28, a solution pump 27, a hot water pump 39 and a shell 23 encasing a condenser 29, an evaporator 31 and an absorber 32, of the first heat pump. The outdoor unit 1 also comprises a generator 3, a burner 4, a solution heat exchanger 5, an evaporator 6, blower means 7, solution pump 8, and pressure reducing means 9 and 10 of the second heat pump, as well as a condenser 11 and an absorber 12 mounted in the evaporator 31 of the first heat pump.

The indoor unit 2 comprises a hot water heat exchanger 37 and blower means 38. The first heat pump uses water as a refrigerant and an aqueous solution of lithium bromide as an absorbing agent, and the second heat pump uses Freon R-22 ($CHCLF_2$) as a refrigerant and tetraethylene glycol dimethyl ether as an absorbing agent.

In the generator 3 of the second heat pump, the Freon R-22 is changed into a gaseous state as it is heated by the burner 4. The refrigerant in the gaseous state flows through a line 13 to the condenser 11 mounted in the evaporator 31 of the first heat pump to give off heat therein and change into a liquid state. The refrigerant in the liquid state flows from the condenser 11 through a line 14 to the pressure reducing means 9 where it has its pressure reduced and is introduced into the evaporator 6 to be vaporized therein. The heat of vaporization is obtained from outdoor air through the blower means 7. The absorbing agent in liquid form (tetraethylene glycol dimethyl ether) releases the refrigerant in the generator 3 and flows from the generator 3 through a line 15 to the solution heat exchanger 5 where it is cooled. Thereafter the absorbing liquid flows through a line 16 to the pressure reducing means 10 where it has its pressure reduced and joins the refrigerant in a gaseous state from the evaporator 6, to be led to the absorber 12 mounted in the evaporator 31 of the first heat pump. In the absorber 12, the refrigerant is absorbed by the absorbing liquid. The solution containing a large quantity of refrigerant flows through a line 17 and is fed to the solution heat exchanger 5 where it is preheated before being led into the generator 3 by the solution pump 8. In this way, the second heat pump absorbs heat from the fuel of the burner 4 and outdoor air and gives off heat in the evaporator 31 of the first heat pump.

Meanwhile the generator 24 of the first heat pump generates steam of the refrigerant heated by the burner 25. The refrigerant in the state of steam flows through a line 18 to the condenser 29 where it gives off the heat of condensation to hot water flowing through a line 19 to the condenser 29 and changes back into a liquid state to be collected on a partition shelf 30. The refrigerant in the liquid state is shot out in fine particles through a sprayer 33 by the refrigerant pump 28 in the evaporator 31 and changes into a gaseous state by deriving heat from the condenser 11 and the absorber 12 of the second heat pump. The absorbing liquid or the aqueous solution of lithium bromide concentrated in the generator 24 is released from the generator 24 and cooled at the solution heat exchanger 26, to be shot out in fine particles through a sprayer 34. In the absorber 32, the absorbing liquid releases the heat of absorption into the hot water fed through a line 20 from the hot water heat exchanger 37 while absorbing the refrigerant in the gaseous state in the evaporator 31. The solution diluted after finishing absorption is fed from a solution sump 36 to the solution heat exchanger 26 through a line 21 by the solution pump 27. After being subjected to preheating in the solution heat exchanger 26, the diluted solution enters the generator 24. The refrigerant yet to be evaporated in the evaporator 31 is fed from a refrigerant sump 35 to the sprayer 33 again by the refrigerant pump 28 to be shot out in fine particles.

In the evaporator 31, the condenser 11 is located in an upper portion and the absorber 12 is located in a lower portion with respect to the direction in which the refrigerant drips. The hot water deriving heat from the absorber 32 and the condenser 29 is flowed by a hot water pump 39 through lines 19, 20 and 22 between the hot water heat exchanger 37 and the outdoor unit 1, to release heat at the hot water heat exchanger 37 in the form of heated air by the blower means 38 to perform space heating.

In the heat pump cycle described hereinabove, a total of the heat introduced from the burners 4 and 25 into the generators 3 and 24 and the heat introduced from outdoor air into the evaporator 6 is released into the room through the hot water heat exchanger 37. Thus it will be appreciated that the outdoor air used as a heat source is inexhaustible and enables great improvements to be provided to the performance of heat pump system as compared with combustion type heaters of the prior art. In the heat pump system according to the invention, the coefficient of heating performance is over 1.0 when outdoor temperature drops below zero (0° C.).

In the heat pump system shown in FIG. 1, the operation points are such that when outdoor temperature is 0° C., the temperatures at the evaporator 6, the condenser 11 and the absorber 12 outlet, the evaporator 31, and the condenser 29 and the absorber 32 outlet are −10° C., 30° C., 25° C. and 65° C. respectively. Thus the hot water entering the hot water heat exchanger 37 has a temperature of 60° C. and the heated air introduced in air currents into the space to be heated has a temperature of 50° C., enabling space heating to be carried out in a manner to give comfort to persons in the space.

The heating performance coefficient of the heat pump system according to the invention can be expressed by the following formula:

$$COP_{HT} = \frac{COP_{H1} \cdot COP_{H2}}{COP_{H1} + COP_{H2} - 1}$$

where
$COP_{HT}$: the heating performance coefficient of the heat pump system of the invention.
$COP_{H1}$: the heating performance coefficient of the first heat pump.
$COP_{H2}$: the heating performance coefficient of the second heat pump.

Generally, a heating performance coefficient $COP_H$ can be expressed by the following formula:

$$COP_H = 1 + COP_C$$

where $COP_C$ is the cooling performance coefficient. Thus the heating performance coefficient is over 1.0 at all times, so that the heating performance coefficient of the heat pump system according to the invention is over 1.0 at all times regardless of the conditions.

Figure 2:
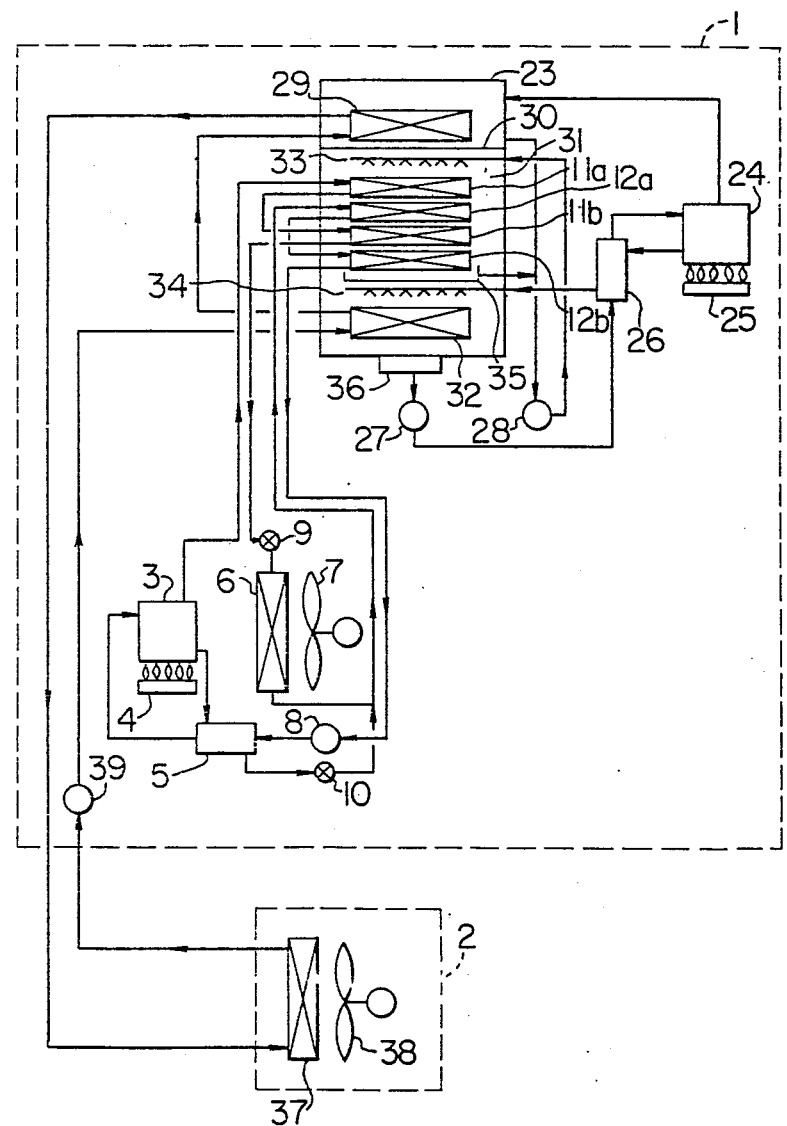
FIG. 2 is a systematic diagram of the absorption type heat pump system comprising a second embodiment of the invention.

FIG. 2 shows a second embodiment of the absorption type heat pump system in conformity with the invention. Basically the heat pump system shown in FIG. 2 is similar in construction to the heat pump system shown in FIG. 1, except that the former is characterized by the construction of the condenser 11 and the absorber 12 of the second heat pump mounted in the evaporator 31 of the first heat pump. In the heat pump system shown in FIG. 2, the condenser and the absorber of the second heat pump are each divided into two parts which are arranged alternately from above with respect to the direction in which the liquid refrigerant drips after being shot out from the sprayer 33 in such a manner that a condenser member 11a, an absorber member 12a, a condenser member 11b and an absorber member 12b are located in the indicated order from above. The heat pump system of this arrangement also has a heating performance coefficient of over 1.0.

Figure 3:
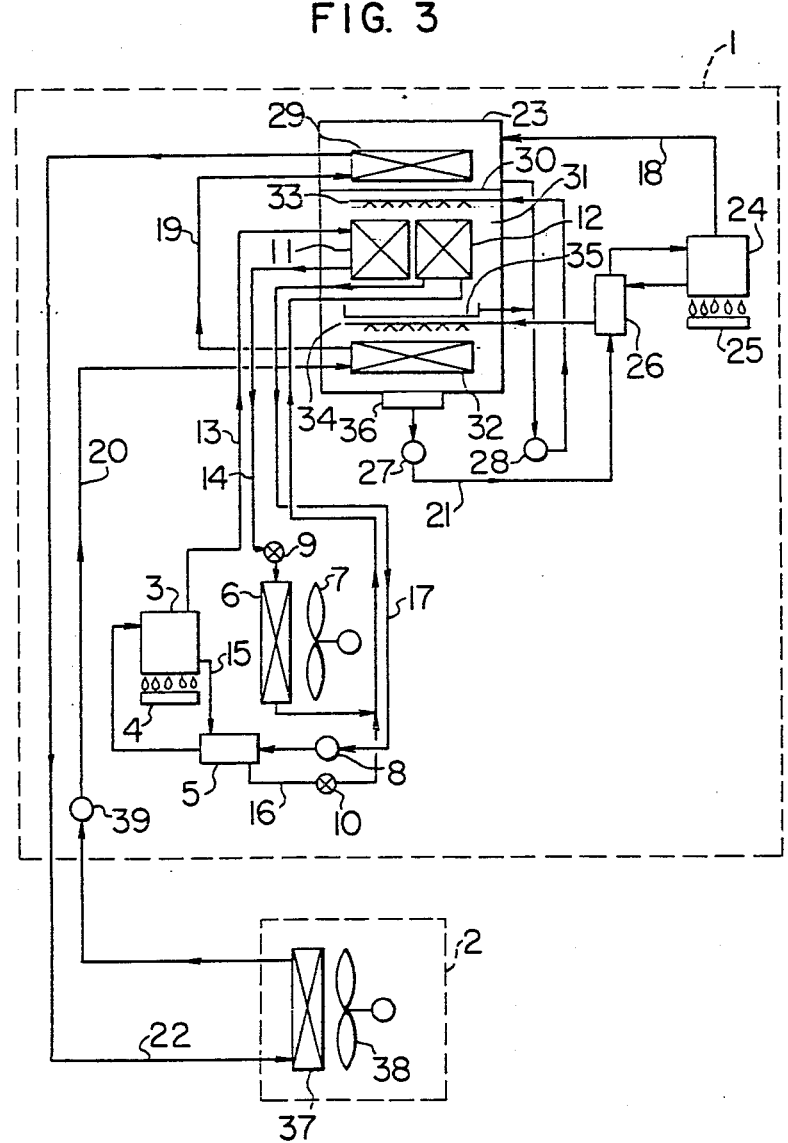
FIG. 3 is a systematic diagram of the absorption type heat pump system comprising a third embodiment of the invention.

FIG. 3 shows a third embodiment of the heat pump system in conformity with the invention, which also comprises an outdoor unit 1 and an indoor unit 2. The outdoor unit 1 comprises a generator 24, a burner 25, a solution heat exchanger 26, a refrigerant pump 28, a solution pump 27, a hot water pump 39 and a shell 23 encasing a condenser 29, an evaporator 31 and an absorber 32, of the first heat pump, as well as a generator 3, a burner 4, a solution heat exchanger 5, an evaporator 6, blower means 7, a solution pump 8, pressure reducing means 9, 10, a condenser 11 and an absorber 12 of the second heat pump, the condenser 11 and absorber 12 being mounted in the evaporator 31 of the first heat pump. In the heat pump system of the aforesaid construction, the condenser 11 and the absorber 12 of the second heat pump are arranged in parallel or horizontally with respect to the direction in which the refrigerant in a liquid state drips from a sprayer 33. Parts not described and connections thereof are similar to those shown in FIG. 1, so that their description shall be omitted. The indoor unit 2 comprises a hot water heat exchanger 37 and blower means 38. The first pump uses water as a refrigerant and an aqueous solution of lithium bromide as an absorbing agent. The second heat pump uses Freon R-22 as a refrigerant and tetraethylene glycol dimethyl ether as an absorbing agent. Besides the refrigerants and absorbing agents described hereinabove, the following combinations of refrigerant and absorbing agent may be used in the invention.

For the second heat pump, combinations of ammonia as a refrigerant and water as an absorbing agent; Freon R-21 as a refrigerant and tetraethylene glycol dimethyl ether as an absorbing agent; Freon R-22 as a refrigerant and dimethylformamide as an absorbing agent; Freon R-21 as a refrigerant and dimethylformamide as an absorbing agent; Freon R-22 as a refrigerant and dibutyl phthalate as an absorbing agent; Freon R-22 as a refrigerant and cyclohexanone as an absorbing agent; and Freon R-21 as a refrigerant and cyclohexanone as an absorbing agent.

Figure 4:
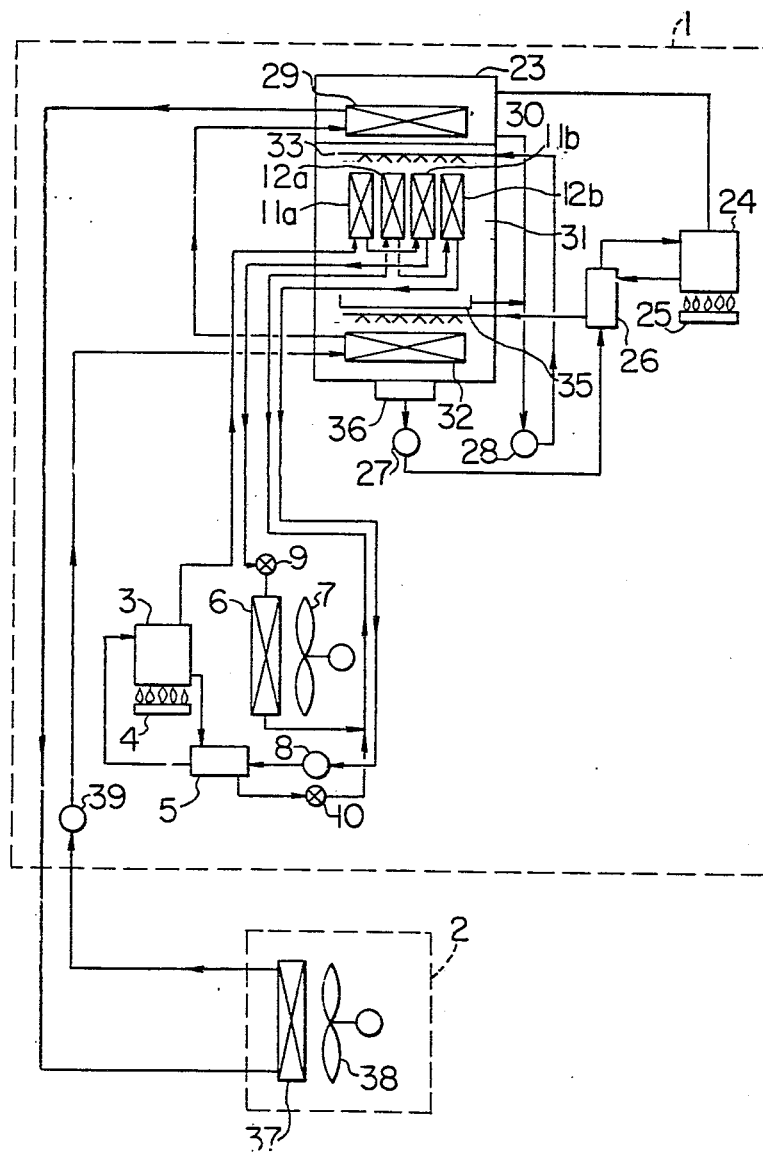
FIG. 4 is a systematic diagram of the absorption type heat pump system comprising a fourth embodiment of the invention.

FIG. 4 shows a fourth embodiment of the heat pump system in conformity with the invention. Basically this embodiment is similar to that shown in FIG. 3 in construction except that the former is characterized by the construction of the condenser 11 and the absorber 12 of the second heat pump mounted in the evaporator 31 of the first heat pump. In this heat pump system, the condenser and the absorber of the second heat pump are each divided into two parts which are arranged alternately in parallel with respect to the direction in which the refrigerant in a liquid state drips from the sprayer 33 in such a manner that a condenser member 11a, an absorber member 12a, a condenser member 11b and an absorber member 12b are located in the indicated order. This heat pump system also has a heating performance coefficient of over 1.0.

From the foregoing description, it will be appreciated that the embodiments of the invention described hereinabove offers the following advantages:

(1) Outdoor air which is inexhaustible can be used as a heat source, and space heating can be performed by using this heat source even if the outdoor temperature drops below zero (0° C.).

(2) It is possible to obtain a compact size in an indoor heat exchanger, and only two pipes are needed to connect the indoor unit with the outdoor unit.

(3) In operation, the first heat pump and the second heat pump have small pressure differentials between the pressure of condensation and the pressure of vaporization. This is conductive to increased cycle efficiency and low boosting requirements of the solution pumps.

(4) It is possible to raise the pressure of condensation of the first heat pump, so that the temperature of the heated air blown into the room can be raised to perform heating in a manner to provide comfort.

(5) The heat pump system can have a heating performance coefficient of over 1.0 at all times under any conditions including outdoor temperature being below zero (0° C.).

From the foregoing, it will be appreciated that the invention enables inexhaustible outdoor air to be utilized as a heat source and permits heating to be effected by using outdoor air as a heat source even when outdoor temperature is below zero (0° C.).

What is claimed is:

1. A absorption type heat pump system comprising a first heat pump of the absorption type and a second heat pump of the absorption type, said first heat pump of the absorption type comprising a generator equipped with a heating source, a condenser, an evaporator, an absorber, and a solution heat exchanger for supplying hot water for heating and hot water supply purposes from said condenser and said absorber, and said second heat pump of the absorption type comprising a generator equipped with a heating source, a condenser, an evaporator, an absorber, and a solution heat exchanger, wherein the improvement resides in that:

said condenser and said absorber of said second heat pump of the absorption type are both mounted in said evaporator of said first heat pump of the absorption type, and the evaporator of the first heat pump is connected with the second heat pump, in a manner so as to cause heat given off by said condenser and said absorber of said second heat pump to be utilized as a heat source for vaporizing a refrigerant in said evaporator of said first heat pump, a refrigerant in the condenser of the second heat pump to be condensed by heat of evaporation of the refrigerant in the evaporator of the first heat pump and the condensed refrigerant absorbed by an absorbing agent in the absorber of the second heat pump.

2. An absorption type heat pump system as claimed in claim 1, wherein said evaporator of said first heat pump is equipped with a sprayer for shooting out in fine particles a refrigerant in a liquid state, and the condenser and the absorber of the second heat pump mounted in the evaporator of the first heat pump are located in superposed relation one above the other in a vertical direction in such a manner that the condenser is disposed immediately below the sprayer and the absorber is disposed below the condenser.

3. An absorption type heat pump system as claimed in claim 1, wherein said evaporator of said first heat pump is equipped with a sprayer for shooting out in fine particles a refrigerant in a liquid state, and the condenser and the absorber of the second heat pump mounted in the evaporator of the first heat pump are located side by side in a horizontal direction.

4. An absorption type heat pump system as claimed in claim 1, wherein said evaporator of said first heat pump is equipped with a sprayer for shooting out in fine particles a refrigerant in a liquid state, and the condenser and the absorber of the second heat pump mounted in the evaporator of the first heat pump are each divided into a plurality of parts.

5. An absorption type heat pump system as claimed in claim 4, wherein the condenser members and the absorber members of the second heat pump are arranged alternately in a vertical direction as viewed from the sprayer.

6. An absorption type heat pump system as claimed in claim 4, wherein the condenser members and the absorber members of the second heat pump are arranged alternately in a horizontal direction.

7. An absorption type heat pump system as claimed in any one of claims 1-4, wherein the first heat pump uses water as a refrigerant and lithium bromide as an absorbing agent, and the second heat pump uses Freon as a refrigerant and tetraethylene glycol dimethyl ether as an absorbing agent.

8. An absorption type heat pump system as claimed in any one of claims 1-4, further comprising a hot water heat exchanger equipped with blower means, said hot water heat exchanger being connected to the condenser and the absorber of the first heat pump.

9. An absorption type heat pump system as claimed in claims 1-4, wherein the first heat pump uses water as a refrigerant and lithium bromide as an absorbing agent, and the second heat pump uses ammonia as a refrigerant and water as an absorbing agent.

10. An absorption type heat pump system as claimed in claim 7, wherein the second heat pump uses dimethylformamide as an absorbing agent.

11. An absorption type heat pump system as claimed in claim 7, wherein the second heat pump uses isobutyl acetate as an absorbing agent.

12. An absorption type heat pump system as claimed in claim 7, wherein the second heat pump uses dibutyl phthalate as an absorbing agent.

13. An absorption type heat pump system as claimed in claim 7, wherein the second heat pump uses cyclohexanone as an absorbing agent.

* * * * *